United States Patent
Oki et al.

(10) Patent No.: US 8,848,145 B2
(45) Date of Patent: Sep. 30, 2014

(54) METHOD FOR PRODUCING LIGHT REFLECTIVE FILM, AND LIGHT REFLECTIVE FILM

(75) Inventors: Kazuhiro Oki, Kanagawa (JP); Takao Taguchi, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 506 days.

(21) Appl. No.: 13/188,118

(22) Filed: Jul. 21, 2011

(65) Prior Publication Data

US 2012/0019766 A1    Jan. 26, 2012

(30) Foreign Application Priority Data

Jul. 22, 2010  (JP) ................................ 2010-164984

(51) Int. Cl.

| | | |
|---|---|---|
| *G02F 1/1335* | (2006.01) | |
| *G02F 1/13* | (2006.01) | |
| *G02B 5/08* | (2006.01) | |
| *G02B 27/00* | (2006.01) | |

(52) U.S. Cl.
CPC .......... *G02B 5/0816* (2013.01); *G02B 27/0006* (2013.01)
USPC .............................. 349/115; 349/16; 349/193

(58) Field of Classification Search
CPC .......................................... G02F 2001/133543
USPC ............................................ 349/115, 193, 16
See application file for complete search history.

(56) References Cited

U.S. PATENT DOCUMENTS

| 7,652,736 B2 | 1/2010 | Padiyath et al. | |
|---|---|---|---|
| 2007/0109673 A1 | 5/2007 | Padiyath et al. | |
| 2008/0069975 A1* | 3/2008 | Kato et al. | 428/1.31 |
| 2011/0097562 A1* | 4/2011 | Brill et al. | 428/212 |

FOREIGN PATENT DOCUMENTS

| JP | 2002-022960 | 1/2002 |
|---|---|---|
| JP | 3500127 | 12/2003 |
| JP | 2004-212619 | 7/2004 |
| JP | 2004-252257 | 9/2004 |
| JP | 3745221 | 12/2005 |
| JP | 4008358 | 9/2007 |
| JP | 4109914 | 4/2008 |
| JP | 2009-514022 | 4/2009 |
| JP | 2010-111104 | 5/2010 |
| WO | WO 2007/050433 | 5/2007 |
| WO | WO 2009153287 A1 * | 12/2009 |

OTHER PUBLICATIONS

JP Office Action dated Nov. 12, 2013 with English Translation, Application No. 2010-164984.
JP Office Action dated Feb. 12, 2014, with English translation; Application No. 2010-164984.
Chinese Official Action—201110206280.8—May 5, 2014.

* cited by examiner

*Primary Examiner* — Dennis Y Kim
(74) *Attorney, Agent, or Firm* — Young & Thompson

(57) ABSTRACT

A light reflective film is produced by (a) forming a hard coat layer having a surface energy of less than 30 mN/m and a pencil hardness of at least 2H on a resin film, (b) applying a curable liquid crystal composition onto the surface of the opposite side, (c) drying the applied curable liquid crystal composition to be in a state of a cholesteric liquid crystal phase, (d) promoting the curing reaction to form a light reflective layer, and (e) repeating at least once the process of from (b) to (d).

20 Claims, 1 Drawing Sheet

METHOD FOR PRODUCING LIGHT REFLECTIVE FILM, AND LIGHT REFLECTIVE FILM

CROSS-REFERENCE TO RELATED APPLICATION

The present application claims the benefit of priority from Japanese Patent Application No. 2010-164984, filed on Jul. 22, 2010, the contents of which are herein incorporated by reference in their entirety.

BACKGROUND OF THE INVENTION

1. Field of the Invention

The present invention relates to a method for producing a light reflective film having a light reflective laminate film that includes plural layers each having a cholesteric liquid crystal phase fixed therein, especially to a method for producing such a light reflective film to be stuck to windows of buildings, car windows, etc. The invention also relates to the light reflective film produced according to the production method of the invention.

2. Description of the Related Art

Recently, with the increase in the interest in environment and energy, the needs for energy-saving industrial products are high, and as one of them, glass and films are desired that are effective for heat shields for windowpanes in houses, cars and the like, or that is, for reducing thermal load from sunlight through windowpanes. For reducing the thermal load from sunlight, it is necessary to prevent transmission of the sun's rays in any of the visible range or IR range of the sunlight spectrum. In particular, for car windows, high transmittance in the visible light range is desired from the viewpoint of safety, and the need for heat shielding is also high, and in some countries, there is a tendency to regulate solar reflectance.

Double glass coated with a particular metal film capable of shielding against thermal radiation, which is called low-E pair glass, is well used as eco-glass having high heat insulating/shielding capability. The particular metal film may be formed, for example, by laminating plural layers according to a vacuum film formation method. The particular metal film coating to be formed through vacuum film formation is extremely excellent in reflectivity, but the vacuum process is nonproductive and the production cost thereof is high. In addition, the metal film, when used, concurrently shields against electromagnetic waves, and is therefore problematic in that, when used in mobile phones and the like, it causes radio disturbance, and when used for automobiles, ETC could not be used therein. Not only solving the problem of radio disturbance but also high transmittance of visible light is desired for car windows from the viewpoint of safety.

A method of using a cholesteric liquid crystal phase in a light reflective film has been proposed. For example, as disclosed in Japanese Patent 4109914, by forming one cholesteric liquid crystal layer on both sides of a λ/2 plate, a light circularly-polarized in one direction can be selectively and efficiently reflected within a range of from 700 to 1200 nm.

JP-T 2009-514022 discloses an IR-reflective article having a cholesteric liquid crystal layer, in which a hard coat layer may be formed partly. Regarding lamination of plural cholesteric liquid crystal layers, there have been made various attempts to use the laminate in liquid crystal display devices, and concretely, there are known various approaches to a technique of efficiently reflecting light in a visible light region; and for example, Japanese Patent 3500127 discloses a case of lamination of multiple cholesteric layers. In Examples in Japanese Patent 3500127, a step of applying a cholesteric liquid crystal material to an alignment film-coated glass substrate followed by curing it thereon is repeated to produce the intended laminate.

Japanese Patent 4008358 discloses a method for producing a broadband cholesteric liquid crystal film through UV-polymerization of a predetermined liquid crystal mixture between two substrates. However, there is given no concrete description relating to a method for producing a laminate film including plural layers. Japanese Patent 3745221 discloses a circularly-polarized light extracting optical device in which plural liquid crystal layers each formed of three-dimensionally crosslinked liquid crystal molecules having cholesteric regularity are laminated under a predetermined condition. In Examples in Japanese Patent 3745221, a coating liquid of a liquid crystal material is applied onto a glass substrate in a mode of spin coating and thereafter the liquid crystal molecules are three-dimensionally crosslinked through irradiation with light to form the constitutive layers, thereby producing a laminate-structured device.

JP-A 2002-22960 discloses a case of configuration having an antistatic light-diffusive layer formed on one side or both sides of a cholesteric layer. JP-A 2004-252257 discloses a case of configuration having an antistatic layer formed by applying an antistatic agent to the surface and/or the back of a light-diffusive sheet.

SUMMARY OF THE INVENTION

For producing a reflective film of high heat shieldability, the reflection wavelength band must be broadened, and in general, for wider bandwidth, a laminate structure composed of multiple light reflective layers each having a different selective reflection wavelength is generally employed. The light reflective film having a laminate structure may be produced, for example, in a mode of successive coating with constitutive layers to be laminated or in a mode of laminating plural layers by sticking. In the former method, in general, a coating step, a drying step, an alignment step and a curing step are repeated, in which for curing, for example, photocuring through UV irradiation is employed. In an ordinary coating apparatus, there are provided from 1 to 3 coating steps, and for forming plural layers in the apparatus, the film being produced must be once wound up as a roll, then unrolled, and repeatedly processed in a process of coating, drying, alignment and curing steps. In this case, when the laminate film is once wound up, the coating film and the substrate film are kept in strong contact with each other under tension given thereto, and therefore there is a problem in that, when the coating film is formed on the unrolled laminate film, then the light reflectance thereof lowers.

However, nothing is referred to in any reference, relating to the deterioration of the performance of the light reflective film to be caused by the operation of winding up into a roll and unrolling the rolled film in forming plural layers each having a cholesteric liquid crystal phase fixed therein. In particular, in JP-T 2009-514022 and Japanese Patent 4008358, described is formation of a hard coat layer, but nothing is investigated therein relating to the surface energy of the film surface on the side not laminated with the cholesteric liquid crystal layer and relating to the details of the hard coat layer.

On the other hand, there is known a problem of stickiness such as blocking or the like regarding the influence of the contact between a coating film and the back surface of an ordinary resin film on the step of winding up into a roll, and there is also known a countermeasure thereagainst of lowering the surface energy on the back of the film. However, the present inventors have tried merely lowering the surface energy of the back of a laminate film in which plural cholesteric liquid crystal phase-fixed layers are laminated, but have found that the reduction in the light reflectance of the film could not still be prevented but the haze of the film has rather increased.

The present invention has been made in consideration of the above-mentioned problems. Specifically, an object of the invention for solving the problems is to provide a light reflective film which contains plural layers each having a cholesteric liquid crystal phase fixed therein, which can still maintain good IR reflectivity in a broadband range even after repeated operation of winding up into a roll and unrolling the roll and which has a small haze.

The present inventors have investigated in detail the light reflectivity and the haze of a light reflective film after repeated operation of winding up into a roll and unrolling the roll in forming plural layers each having a cholesteric liquid crystal phase fixed therein. As a result, the inventors have found that, when a hard coat layer having a specific surface energy level and a specific pencil hardness is formed on the surface of a substrate film (resin film) on the side on which a cholesteric liquid crystal layer is not formed, then the above-mentioned problems with the light reflective film including plural cholesteric liquid crystal layers can be solved.

Specifically, the present inventors have found that the above-mentioned problems can be solved by the following constitution, and have completed the present invention. The invention includes the following constitution.

[1] A method for producing a light reflective film, comprising (a) forming a hard coat layer having a surface energy of less than 30 mN/m and a pencil hardness of at least 2H, on one surface of a resin film to produce a laminate, (b) applying a curable liquid crystal composition onto the surface of the laminate opposite to the side thereof given the hard coat layer, (c) drying the applied curable liquid crystal composition to be in a state of a cholesteric liquid crystal phase, (d) promoting the curing reaction of the curable liquid crystal composition to fix the cholesteric liquid crystal phase thereby forming a light reflective layer, and (e) repeating at least once the process of from (b) to (d) on the laminate having the light reflective layer formed thereon.

[2] The method for producing a light reflective film of [1], wherein the curable liquid crystal composition contains a polymerizable rod-shaped liquid crystal compound, an alignment controlling agent capable of controlling the alignment of the polymerizable rod-shaped liquid crystal compound, and a solvent.

[3] The method for producing a light reflective film of [1] or [2], wherein in the process of (b) to (e), at least one layer of reflecting a right circularly-polarized light and at least one layer of reflecting a left circularly-polarized light are formed.

[4] The method for producing a light reflective film of any one of [1] to [3], which comprises aligning the surface of the laminate on the side opposite to the side thereof having the hard coat layer formed thereon, between the step (a) and the step (b).

[5] The method for producing a light reflective film of anyone of [1] to [4], which comprises forming an alignment film on the laminate on the side opposite to the side thereof having the hard coat layer formed thereon, and aligning the surface of the alignment film, between the step (a) and the step (b).

[6] The method for producing a light reflective film of [4] or [5], which comprises aligning the surface of the laminate by rubbing treatment.

[7] The method for producing a light reflective film of any one of [1] to [6], which comprises forming the hard coat layer by using a hard coat layer composition containing a fluorine compound.

[8] The method for producing a light reflective film of any one of [1] to [7], which comprises forming the hard coat layer by using a hard coat layer composition containing a silicon compound.

[9] The method for producing a light reflective film of any one of [1] to [8], wherein the resin film is a polyethylene terephthalate film.

[10] The method for producing a light reflective film of any one of [1] to [9], which is for producing a light reflective film to be stuck to windowpanes.

[11] The method for producing a light reflective film of any one of [1] to [10], which comprises winding up the film into a roll.

[12] A light reflective film produced according to the method for producing a light reflective film of any one of [1] to [11].

[13] The light reflective film of [12] wound up into a roll.

According to the invention, there is provided a light reflective film which contains plural layers each having a cholesteric liquid crystal phase fixed therein, which can still maintain good IR reflectivity in a broadband range even after repeated operation of winding up into a roll and unrolling the roll and which has a small haze.

Figure 1:
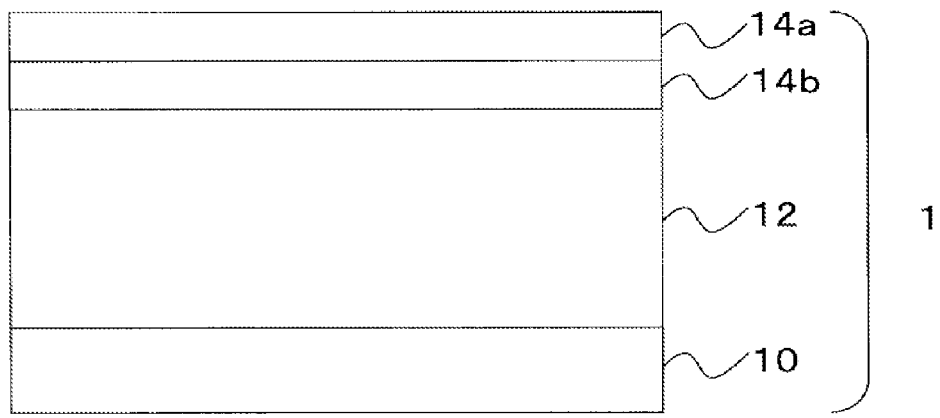
FIG. 1 is a cross-sectional view of one example of the light reflective film produced according to the production method of the invention.

In the drawings, 1 denotes light reflective film, 10 denotes hard coat layer, 12 denotes resin film, and 14a, 14b, 16a and 16b denote light reflective layers.

BEST MODE FOR CARRYING OUT THE INVENTION

In the following, the contents of the invention are described in detail. In this description, the numerical range expressed by the wording "a number to another number" means the range that falls between the former number indicating the lowermost limit of the range and the latter number indicating the uppermost limit thereof. In this description, "light transmittance" is meant to indicate that the film is transmissive to visible light.

[Method for Producing Light Reflective Film]

The method for producing a light reflective film of the invention (hereinafter this may be referred to as the production method of the invention) includes (a) forming a hard coat layer having a surface energy of less than 30 mN/m and a pencil hardness of at least 2H, on one surface of a resin film to produce a laminate, (b) applying a curable liquid crystal composition onto the surface of the laminate opposite to the side thereof given the hard coat layer, (c) drying the applied curable liquid crystal composition to be in a state of a cholesteric liquid crystal phase, (d) promoting the curing reaction of the curable liquid crystal composition to fix the cholesteric liquid crystal phase thereby forming a light reflective layer, and (e) repeating at least once the process of the step (b) to the step (d) on the laminate having the light reflective layer formed thereon.

The production method of the invention includes the above-mentioned constitution, therefore producing a light reflective film which can still maintain good IR reflectivity in a broadband range even after repeated operation of winding up into a roll and unrolling the roll and which has a small haze. The light reflective layer with a cholesteric liquid crystal phase fixed therein exhibits light-selective reflecting characteristics of reflecting a light falling within a specific wavelength range based on the helical pitch of the cholesteric liquid crystal phase. Accordingly, by controlling the helical pitch of the cholesteric liquid crystal phase to thereby cut off only the light falling within a wavelength range of 700 nm or more, a high-level heat-shielding effect can be obtained.

The production method of the invention is described below in point of the materials preferred therein and the steps constituting the method.

<Step (a)>

The production method of the invention includes (a) a step of forming a hard coat layer having a surface energy of less than 30 mN/m and a pencil hardness of at least 2H, on one surface of a resin film to give a laminate.

(Resin Film)

In the production method of the invention, the resin film is not specifically defined. Depending on the intended purpose thereof, the film may be required to have high transparency to UV ray. The film may be a particular retardation plate such as λ/2 plate or the like that is produced in a controlled production process, or may also be a polymer film or the like that would be unusable as prescribed retardation plates since the fluctuation of the in-plane retardation thereof is too great, concretely, when it is expressed as the fluctuation of the in-plane retardation at a wavelength of 1000 nm, Re (1000), the Re (1000) fluctuation of the film is at least 20 nm, or at least 100 nm.

The in-plane retardation of the resin film is not also specifically defined. For example, a retardation plate or the like having an in-plane retardation at a wavelength of 1000 nm, Re (1000) of from 800 to 13000 nm may be usable.

Depending on the intended purpose thereof, a polymer film having a high transmittance to visible light is preferably used here as the resin film. As the polymer film having a high transmittance to visible light, there may be mentioned various types of polymer films for optical films that are used as parts of display devices such as liquid crystal display devices, etc. More concretely, there may be mentioned polyester films such as polyethylene terephthalate (PET), polybutylene terephthalate, polyethylene naphthalate (PEN), etc.; polycarbonate (PC) films, polymethyl methacrylate films; polyolefin films such as polyethylene, polypropylene, etc.; polyimide films, triacetyl cellulose (TAC) films, etc.

In the production method of the invention, the resin film is preferably a polyethylene terephthalate film from the viewpoint of the transparency thereof.

(Lamination of Hard Coat Layer)

The method of forming a hard coat layer on one surface of the resin film to produce a laminate is not specifically defined, for which any known method is employable.

As the method of forming the hard coat layer, there may be mentioned coating and vapor-phase film formation such as sputtering, etc. Above all, coating is preferred, and more preferred is one formed by coating with a coating liquid that contains a polyfunctional monomer or oligomer followed by drying and curing it for obtaining a predetermined hardness.

For the coating method, preferably, the coating liquid is prepared by dissolving and/or dispersing the material in a solvent. Coating with the coating liquid may be attained in various methods of a wire bar coating method, an extrusion coating method, a direct gravure coating method, a reverse gravure coating method, a die coating method, etc. As the case may be, an inkjet apparatus may be used, in which a liquid crystal composition may be jetted out through the nozzle to form a coating film.

(Resin to be Contained in Composition for Hard Coat Layer)

The material to be used in forming the hard coat layer is not specifically defined. Various materials heretofore used as those for hard coat layer formation on a polymer film (for example, PET film) may be used here.

On the other hand, the method of controlling the pencil hardness of the hard coat layer to be at least 2H is not specifically defined, for which any known method is employable. In this, for example, the hard coat layer composition preferably contains, as the main ingredient thereof, at least one difunctional or more polyfunctional polymerizable monomer, from the viewpoint that the hard coat layer formed after light irradiation or thermal polymerization could be readily controlled to have a pencil hardness of at least 2H. The difunctional or more polyfunctional polymerizable monomer is preferably a difunctional or more polyfunctional (meth)acrylate. In this description, "(meth)acrylate" means a generic term of methacrylate and acrylate; and the difunctional or more polyfunctional monomer means a monomer that contains at least two polymerizable groups in one molecule.

Preferably, the difunctional or more polyfunctional (meth)acrylate is photopolymerizable. Depending on the desired pencil hardness, one alone or two or more different types of difunctional or more polyfunctional (meth)acrylates may be used here either singly or as combined. As the difunctional or more polyfunctional (meth)acrylate, herein usable are any known ones; and above all, preferred is use of dipentaerythritol hexaacrylate (DPHA) or pentaerythritol tetraacrylate (PETA) from the viewpoint of securing the hardness.

The hard coat layer composition may further contain, in addition to the difunctional or more polyfunctional (meth)acrylate, a monofunctional (meth)acrylate for the purpose of controlling the viscosity in coating or the pencil hardness after film formation.

(Additive)

The method for controlling the surface energy of the hard coat layer to be less than 30 mN/m is not specifically defined, for which any known method is employable.

Preferably, the production method of the invention includes a step of forming the hard coat layer by using a hard coat layer composition containing a fluorine compound.

Preferably, the fluorine compound is a (meth)acrylate having a perfluoroalkyl group, as capable of giving high water repellency.

The fluorine compound may be commercially available, for which, for example, preferably used are Light Acrylate FA-108, trade name by Kyoeisha Chemical Industry, etc.

The amount of the fluorine compound to be added is preferably from 0.05 to 80% by mass relative to the mass of the entire hard coat layer, more preferably from 0.1 to 60% by mass, even more preferably from 0.2 to 50% by mass.

More preferably, the surface energy of the hard coat layer is from 5 to 29 mN/m, even more preferably from 5 to 20 mN/m. When the surface energy of the hard coat layer is less than 30 mN/m, the effect of the invention can be sufficiently secured.

Also preferably, the production method of the invention includes a step of forming the hard coat layer by using a hard coat layer composition containing a silicon compound from the viewpoint of the soil resistance of the layer of facilitating easy removal of the fingerprints and soil having adhered thereto. As the silicon compound, there may be mentioned silicon rubber and silicon acrylic monomer; and preferably, the layer contains silica particles from the viewpoint of increasing the surface harness thereof.

(Characteristics of Hard Coat Layer Composition)

Preferably, the viscosity of the hard coat layer composition is from 1 to 100 Pa·s from the viewpoint of the coatability thereof, more preferably from 1 to 30 Pa·s.

The coating thickness of the hard coat layer composition is not specifically defined. After cured, the thickness is preferably from 0.1 to 15 μm or so, more preferably from 1 to 10 μm, even more preferably from 3 to 8 μm.

(Alignment Treatment of Surface of Laminate)

Preferably, the production method of the invention includes a step of aligning the surface of the laminate on the side opposite to the side thereof having the hard coat layer formed thereon, between the step (a) and the step (b). The alignment treatment method is not specifically defined, for which employable is a method of using an alignment film.

Preferably, the production method of the invention includes a step of forming an alignment film on the laminate on the side opposite to the side thereof having the hard coat layer formed thereon, and a step of aligning the surface of the alignment film, between the step (a) and the step (b). The alignment film is not specifically defined, for which any known alignment film is usable. The film may be a rubbing alignment film or any other optical alignment film. Above all, preferred is use of a rubbing alignment film, or that is, the production method of the invention preferably includes a step of aligning the surface of the laminate by rubbing treatment.

<Step (b)>

The production method of the invention includes (b) a step of applying a curable liquid crystal composition onto the surface of the laminate opposite to the side thereof given the hard coat layer.

(Coating Method)

In the step (b), the curable liquid crystal composition is applied onto the surface of the laminate, or that is, onto the surface of resin film or the underlying light reflective layer. The coating method with the curable liquid crystal composition is not specifically defined, for which any known method is employable. Preferably, the material is dissolved and/or dispersed in a solvent to prepare a coating liquid. The coating liquid may be applied according to various methods of a wire bar coating method, an extrusion coating method, a direct gravure coating method, a reverse gravure coating method, a die coating method, etc. As the case may be, an inkjet apparatus may be used, in which the liquid crystal composition may be jetted out through the nozzle to form a coating film.

(Curable Liquid Crystal Composition)

Next described are the materials to be contained in the curable liquid crystal composition.

Preferably, the curable liquid crystal composition for forming the light reflective layer contains, for example, at least a rod-shaped liquid crystal compound, an alignment controlling agent capable of controlling the alignment of the rod-shaped liquid crystal compound, and a solvent; and more preferably, the rod-shaped liquid crystal compound is a polymerizable rod-shaped liquid crystal compound.

Also preferably, the curable liquid crystal composition contains at least a rod-shaped liquid crystal compound, an optically-active compound (this may be referred to as a chiral agent), and a polymerization initiator.

More preferably, the composition contains a polymerization initiator. The composition may contain two or more different types of the respective ingredients. For example, both a polymerizable liquid crystal compound and a non-polymerizable liquid crystal compound may be in the composition. Both a low-molecular liquid crystal compound and a high-molecular liquid crystal compound may also be in the composition.

In addition, for the purpose of enhancing the alignment uniformity and the coating aptitude and increasing the film strength, the composition may contain at least one selected from various additives of a horizontal alignment agent, a unevenness inhibitor, a cissing improver, a polymerizable monomer, etc. If desired, a polymerization inhibitor, an antioxidant, a UV absorbent, a light stabilizer and the like may be further added to curable liquid crystal composition within a range not detracting from the optical performance of the film.

The materials preferably contained in the curable liquid crystal composition are described below.

(1) Polymerizable Rod-Shaped Liquid Crystal Compound:

One example of the rod-shaped liquid crystal compound usable in the invention is a rod-shaped nematic liquid crystal compound. Preferred examples of the rod-shaped nematic liquid crystal compound are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolanes and alkenylcyclohexylbenzonitriles. Not only low-molecular liquid crystal compounds but also high-molecular liquid crystal compounds are usable here.

The rod-shaped liquid crystal compound for use in the invention may be polymerizable or non-polymerizable. Rod-shaped liquid crystal compounds not having a polymerizable group are described in various references (for example, Y. Goto, et. al., Mol. Cryst. Liq. Cryst. 1995, Vol. 260, pp. 23-28).

The polymerizable rod-shaped liquid crystal compound may be obtained by introducing a polymerizable group into a rod-shaped liquid crystal compound. Examples of the polymerizable group include an unsaturated polymerizable group, an epoxy group and an aziridinyl group. Preferred is an unsaturated polymerizable group, and more preferred is an ethylenic unsaturated polymerizable group. The polymerizable group may be introduced into the molecule of a rod-shaped liquid crystal compound in various methods. The number of the polymerizable groups that the polymerizable rod-shaped liquid crystal compound has is preferably from 1 to 6, more preferably from 1 to 3. Examples of the polymerizable rod-shaped liquid crystal compound includes the compounds described in Makromol. Chem., Vol. 190, p. 2255 (1989); Advanced Materials, Vol. 5, p. 107 (1993); U.S. Pat. Nos. 4,683,327, 5,622,648, 5,770,107; WO95/22586, WO95/24455, WO97/00600, WO98/23580, WO98/52905; JP-A 1-272551, 6-16616, 7-110469, 11-80081, 2001-328973, etc. Two or more different types of polymerizable rod-shaped liquid crystal compounds may be used here as combined. When two or more different types of polymerizable rod-shaped liquid crystal compounds are used as combined, the alignment temperature may be lowered.

(2) Alignment Controlling Agent:

An alignment controlling agent that contributes toward stable and rapid formation of the cholesteric liquid crystal phase may be added to the curable liquid crystal composition. Examples of the alignment controlling agent include compounds of the following general formulae (I) to (IV). Two or more of the compounds may be selected to be included. These compounds can reduce the tilt angle of the molecule of a liquid crystal compound or can align the molecule substantially horizontally in the interface of the layer to air. Further, the compounds of the following formulae (I) to (IV) are all excellent in diffusibility from lower layer to upper layer, and are therefore especially useful as the alignment controlling agent in the method of the invention.

In this description, "horizontal alignment" means that the long axis of a liquid crystal molecule is parallel to the film face, but does not require strict parallelness; and in this description, "horizontal alignment" means that the tilt angle to the horizontal face is less than 20 degrees. In case where a liquid crystal compound aligns horizontally near the interface to air, there may hardly occur alignment deficiency and therefore the transparency in the visible light region could increase and the reflectance in the IR region could also increase. On the other hand, when the molecules of liquid crystal compound align at a large tilt angle, then the helical axis of the cholesteric liquid crystal phase may shift from the normal line to the film face and the case is therefore unfavorable since the reflectance may lower, finger print patterns may occur and the haze may increase to exhibit refraction.

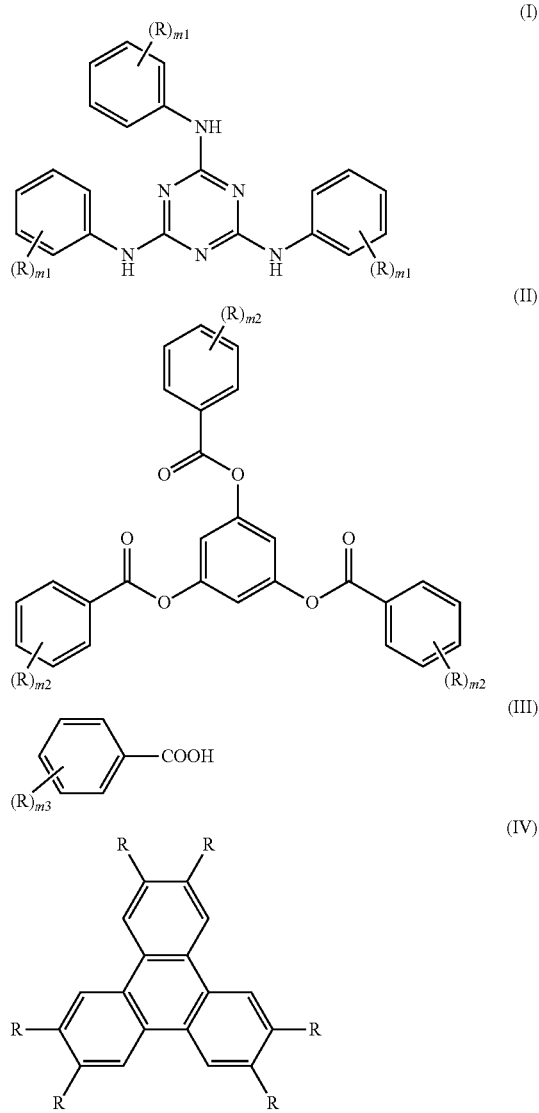

In the above formulae, R's may be the same or different, each representing an alkoxy group having from 1 to 30 carbon atoms and optionally substituted with a fluorine atom, preferably an alkoxy group having from 1 to 20 carbon atoms, more preferably an alkoxy group having from 1 to 15 carbon atoms. However, one or more $CH_2$'s in the alkoxy group or two or more $CH_2$'s not adjacent to each other therein may be substituted with —O—, —S—, —OCO—, —COO—, —$NR^a$—, —$NR^aCO$—, —$CONR^a$—, —$NR^aSO_2$—, or —$SO_2NR^a$—; and $R^a$ represents a hydrogen atom or an alkyl group having from 1 to 5 carbon atoms. Preferably, the compound has at least one fluorine atom, since many molecules of the compound of the type may be distributed as eccentrically located in the interface to air and can be readily dissolved and diffused out into the upper layer. Preferably, the terminal carbon atom of the compound is substituted with a fluorine atom, and also preferably the compound has a perfluoroalkyl group at the terminal thereof.

Preferred examples of R are:

—$OC_nH_{2n+1}$

—$(OC_2H_4)_{n1}(CF_2)_{n2}F$

—$(OC_3H_6)_{n1}(CF_2)_{n2}F$

—$(OC_2H_4)_{n1}NR^aSO_2(CF_2)_{n2}F$

—$(OC_3H_6)_{n1}NR^aSO_2(CF_2)_{n2}F$

In the above formulae, n, n1 and n2 each indicate an integer of 1 or more; n is preferably from 1 to 20, more preferably from 5 to 15; n1 is preferably from 1 to 10, more preferably from 1 to 5; n2 is preferably from 1 to 10, more preferably from 2 to 10.

In the above formulae, m1, m2 and m3 each indicate an integer of 1 or more.

Preferably, m1 is 1 or 2, more preferably 2. When m1 is 1, R is preferably para-positioned, and when 2, R is preferably meta- and para-positioned.

Preferably, m2 is 1 or 2, more preferably 1. When m2 is 1, R is preferably para-positioned, and when 2, R is preferably meta- and para-positioned.

Preferably, m3 is from 1 to 3, and more preferably, R is at two meta positions and at one para-position relative to —COOH.

Examples of the compounds of the above-mentioned formula (I) include the compounds shown in [0092] and [0093] in JP-A 2005-99248.

Examples of the compounds of the formula (II) include the compounds shown in [0076] to [0078] and [0082] to [0085] in JP-A 2002-129162.

Examples of the compounds of the formula (III) include the compounds shown in [0094] and [0095] in JP-A 2005-99248.

Examples of the compounds of the formula (IV) include the compounds shown in [0096] in JP-A 2005-99248.

The amount of the alignment controlling agent to be in the curable liquid crystal composition is preferably from 0.01 to 10% by mass of the mass of the liquid crystal compound therein, more preferably from 0.02 to 1% by mass.

(3) Solvent:

The solvent in the curable liquid crystal composition is not specifically defined, for which any known solvent for liquid crystal compound is usable. The type of the solvent is not also specifically defined. For example, as the solvent, there may be mentioned ketones (acetone, 2-butanone, methyl isobutyl ketone, cyclohexanone, etc.); ethers (dioxane, tetrahydrofuran, etc.); aliphatic hydrocarbons (hexane, etc.); alicyclic hydrocarbons (cyclohexane, etc.); aromatic hydrocarbons (toluene, xylene, etc.); halogenohydrocarbons (dichloromethane, dichloroethane, etc.); esters (methyl acetate, ethyl acetate, butyl acetate, etc.); water; alcohols (ethanol, isopropanol, butanol, cyclohexanol, etc.); cellosolves (methyl cellosolve, ethyl cellosolve, etc.); cellosolve acetates; sulfoxides (dimethyl sulfoxide, etc.); amides (dimethylformamide, dimethylacetamide, etc.); etc. In the production method of the invention, use of 2-butanone is more preferred from the viewpoint of the solubility of the solid ingredients and the drying efficiency of the coating film. On the other hand, for easy dissolution of the alignment controlling agent therein, a solvent having a high polarity may also be sued. Concretely, toluene, methyl ethyl ketone, N-methylpyrrolidone or the like is preferred for the case. One or more such solvents may be used here either singly or as combined.

From the viewpoint of the coating film formability and the production efficiency, the solid concentration in the curable liquid crystal composition is preferably from 10 to 50%, more preferably from 15 to 40%.

(4) Optically-Active Compound (Chiral Agent):

The curable liquid crystal composition exhibits a cholesteric liquid crystal phase, for which the composition preferably contains an optically-active compound. However, in case where the rod-shaped liquid crystal compound is a molecule having an asymmetric carbon atom, there may be a case where the composition could stably form a cholesteric liquid crystal phase even though an optically-active compound is not added thereto. The optically-active compound may be selected from various known chiral agents (for example, as described in Liquid crystal Device Handbook, Chap. 3, Item 4-3, Chiral Agents for TN and STN, p. 199, by the 142nd Committee of the Japan Society for the Promotion of Science, 1989). The optically-active compound generally contains an asymmetric carbon atom; however, an axial asymmetric compound or a planar asymmetric compound not containing an asymmetric carbon atom may also be used here as the chiral agent. Examples of the axial asymmetric compound or the planar asymmetric compound include binaphthyl, helicene, paracyclophane and their derivatives. The optically-active compound (chiral agent) may have a polymerizable group. In case where the optically-active compound has a polymerizable group and the rod-shaped liquid crystal compound to be used concurrently also has a polymerizable group, a polymer may be formed through polymerization of the polymerizable optically-active compound and the polymerizable rod-shaped liquid crystal compound, which has a recurring unit derived from the rod-shaped liquid crystal compound and a recurring unit derived from the optically-active compound. In this embodiment, preferably, the polymerizable group which the polymerizable optically-active compound is a group of the same type as that of the polymerizable group which the polymerizable rod-shaped liquid crystal compound. Accordingly, preferably, the polymerizable group of the optically-active compound is also an unsaturated polymerizable group, an epoxy group or an aziridinyl group, more preferably an unsaturated polymerizable group, even more preferably an ethylenic unsaturated polymerizable group.

The optically-active compound may be a liquid crystal compound.

The amount of the optically-active compound in the curable liquid crystal composition is preferably from 1 to 30 mol % of the liquid crystal compound therein. The amount of the optically-active compound in the composition is preferably smaller in order that the compound does not have any influence on the liquid crystallinity of the composition. Accordingly, the optically-active compound to be used as a chiral agent in the composition is preferably a compound having a strong torsion force in order that the compound could attain the desired helical pitch torsion alignment even though its amount used is small. As the chiral agent having such a strong torsion force, for example, there may be mentioned the chiral agents described in JP-A 2003-287623, and these are favorably used also in the invention.

(5) Polymerization Initiator:

The curable liquid crystal composition for forming the light reflective layer is preferably a polymerizable liquid crystal composition, for which, therefore, the composition preferably contains a polymerization initiator. One embodiment of the polymerizable liquid crystal composition is a UV-curable liquid crystal composition that contains a photopolymerization initiator capable of initiating polymerization through irradiation with UV ray. Examples of the photopolymerization initiator include α-carbonyl compounds (as described in U.S. Pat. Nos. 2,367,661, 2,367,670), acyloin ethers (as described in U.S. Pat. No. 2,448,828), α-hydrocarbon-substituted aromatic acyloin compounds (as described in U.S. Pat. No. 2,722,512), polynuclear quinone compounds (as described in U.S. Pat. Nos. 3,046,127, 29,517,589), combination of triarylimidazole dimer and p-aminophenyl ketone (as described in U.S. Pat. No. 3,549,367), acridine and phenazine compounds (as described in JP-A 60-105667, U.S. Pat. No. 4,239,850), oxadiazole compounds (as described in U.S. Pat. No. 4,212,970), etc.

The amount of the photopolymerization initiator to be used is preferably from 0.1 to 20% by mass of the curable liquid crystal composition (or the solid content of the coating liquid of the composition), more preferably from 1 to 8% by mass.

(Preparation of Additive)

Preferably, the light reflective film of the invention has a light reflective layer of such that the peak (maximum level) of the highest wavelength of the light to be reflected by it is at least 700 nm, or that is, a so-called IR-reflective layer, more preferably, the number of the peaks of the wavelength of the light to be reflected by the light reflective layer is at least one within a range of from 800 to 1300 nm. The selective reflectiveness to light having a wavelength of at least 700 nm is attained by the cholesteric liquid crystal phase having a helical pitch of generally from 500 to 1350 nm or so (preferably from 500 to 900 nm or so, more preferably from 550 to 800 nm or so, and having a thickness of generally from 1 µm to 8 µm or so (preferably from 3 to 8 µm or so).

The selective reflection wavelength of the light reflective layer is defined by the helical pitch, and the selective wavelength tends to shift toward the lower wavelength side when the incident direction of light is tilted from the normal line direction relative to the layer surface. Accordingly, for example, the helical pitch is first optimized relative to the introduction of light from the normal line direction, then the relationship between the incident angle and the shifting toward the shorter wavelength side of the selective reflection wavelength is confirmed through actual measurement, and the helical pitch may be computed from the measured data. The desired helical pitch to be computed in that manner can be attained by controlling at least one factor of the type of the chiral agent, the amount thereof and the polymerization reactivity.

Specifically, in the production method for a light reflective film of the invention, a light reflective layer having a desired helical pitch can be formed by controlling the type and the concentration of the materials (mainly the liquid crystal material and the chiral agent) for use for forming the light reflective layer. The cholesteric liquid crystal phase having a desired optical rotation may be made by selecting the chiral agent or the liquid crystal material itself. The thickness of the layer may be made to fall within the desired range by controlling the coating amount.

<Step (c)>

The production method of the invention includes (c) a step of drying the applied curable liquid crystal composition to be in a state of a cholesteric liquid crystal phase.

In an embodiment where the curable liquid crystal composition is prepared as a coating liquid that contains a solvent, the coating film may be dried to remove the solvent thereby providing the intended cholesteric liquid crystal phase state. If desired, the coating film may be heated so that it may reach the transition temperature into a cholesteric liquid crystal phase. For example, the film may be once heated up to a temperature of an isotropic phase, and thereafter it may be cooled to the cholesteric liquid crystal phase transition temperature, whereby the coating film may be stably made to be in a state of a cholesteric liquid crystal phase. The liquid crystal phase transition temperature of the curable liquid crystal composition is preferably within a range of from 10 to 250° C. form the viewpoint of the production aptitude, more preferably within a range of from 10 to 150° C. When the temperature is lower than 10° C., an additional cooling step may be necessary for lowering the composition to be in a temperature range in which the composition exhibits a liquid crystal phase. When the temperature is not higher than 200° C., then the coating film does not require a higher temperature than the temperature range where the composition exhibits a liquid crystal phase, in order that the composition could be once in an isotropic liquid state at such a high temperature, and therefore waste of heat energy, and deformation and degradation of light-transmissive support could be prevented.

<Step (d)>

The production method of the invention includes (d) a step of promoting the curing reaction of the curable liquid crystal composition to fix the cholesteric liquid crystal phase thereby forming a light reflective layer.

The method of promoting the curing reaction of the coating film that is in the above-mentioned state of a cholesteric liquid crystal phase is not specifically defined, for which any known method is employable. Above all, preferred is a method of irradiating the composition with UV ray.

For the UV irradiation, employable is a light source such as a UV lamp, etc. In this step, the curing reaction of the liquid crystal composition is promoted by irradiation with UV ray, whereby the cholesteric liquid crystal phase is fixed to form a light reflective layer.

Not specifically defined, the UV irradiation energy dose is, in general, preferably from 100 mJ/cm$^2$ to 800 mJ/cm2 or so. The time for which the coating film is irradiated with UV ray is not also specifically defined but may be defined from the viewpoint of both the sufficient strength of the cured film and the producibility thereof.

The wavelength of the UV ray is not also specifically defined. Depending on the use application of the light reflective film and on the strength after curing that is needed for the light reflective film, UV ray having a specific wavelength may be cut off by the use of a UV cutoff filter or a resin film having UV absorbability.

For promoting the curing reaction, the UV irradiation may be attained under heat. Preferably, the temperature during the UV irradiation is so controlled as to fall within a temperature range within which the cholesteric liquid crystal phase is not disordered but can be kept well as such. The oxygen concentration in the atmosphere may have some influence on the degree of polymerization, and therefore, in case where the desired degree of polymerization could not be attained in air and the film strength is insufficient, it is desirable that the oxygen concentration in the atmosphere is lowered according to a method of nitrogen purging or the like. The preferred oxygen concentration is at most 10%, more preferably at most 7%, most preferably at most 3%. The reactivity of the curing reaction (for example, polymerization reaction) to be promoted by the UV irradiation is preferably at least 70%, from the viewpoint of securing the mechanical strength of the layer and preventing any unreacted substance from flowing away from the layer, more preferably at least 80%, even more preferably at least 90%. For increasing the reactivity, effectively employed is a method of increasing the UV irradiation dose or a method of attaining the polymerization in a nitrogen atmosphere or under heat. Also employable is a method of heating the film after polymerization, at a temperature higher than the polymerization temperature to further promote the thermal polymerization, or a method of again irradiating the film with UV ray (provided that the re-irradiation is attained under the condition that satisfies the condition of the invention). The reactivity may be determined by measuring the absorption intensity of the IR vibrational spectrum of the reactive group (for example, polymerizable group) before and after the reaction and comparing the found data.

In the above step (d), the cholesteric liquid crystal phase is fixed to form the light reflective layer. In this, in the "fixed" state of the liquid crystal phase, the alignment of the liquid crystal compound in the state of the cholesteric liquid crystal phase is in the most typical and most preferred state. Not limited thereto, the state further means that, concretely at from 0° C. to 50° C., or under a more severe condition falling within a temperature range of from −30° C. to 70° C., the layer loses flowability and does not undergo any alignment change by any external field or external force, or that is, the layer continues to stably keep the fixed alignment state thereof. In the invention, the alignment state of the cholesteric liquid crystal phase is fixed by the curing reaction to be promoted by UV irradiation.

In the invention, it is enough that the optical properties of the cholesteric liquid crystal phase are kept in the layer, and it is unnecessary that the liquid crystal composition in the layer could finally exhibit liquid crystallinity. For example, the liquid crystal composition may be polymerized by the curing reaction and may lose the liquid crystallinity thereof.

<Step (e)>

The production method of the invention includes (e) a step of repeating at least once the process of the step (b) to the step (d) on the laminate having the light reflective layer formed thereon.

In the step (e) in the production method of the invention, a light reflective film 1 having at least two light reflective layers 14a and 14b each with a cholesteric liquid crystal phase fixed therein can be produced, as in FIG. 1 to be described below. Repeating the step gives a light reflective film having at least four light reflective layers as in FIG. 2.

Needless-to-say, not limited to the embodiments of the light reflective film shown in FIG. 1 and FIG. 2 and to the embodiments of the production method described in detail hereinabove, the production method of the invention is usable for production of any and every type of light reflective film having at least two light reflective layer each with a cholesteric liquid crystal phase fixed therein.

(Relationship Between Plural Light Reflective Layers)

In the production method of the invention, preferably, in the process of the above-mentioned steps (b) to (e), at least one layer of reflecting a right circularly-polarized light and at least one layer of reflecting a left circularly-polarized light are formed. For example, this is described with reference to FIG. 1 and FIG. 2. For forming the light reflective layer 14b on the surface of the light reflective layer 14a, a curable liquid crystal composition is applied thereon. Like that for the light reflective layer 14*a*, the curable liquid crystal composition also contains a dextrorotatory or levorotatory chiral agent, and/or an asymmetric carbon atom-having liquid crystal material in order to exhibit a cholesteric liquid crystal phase. In particular, the composition preferably contains a chiral agent of which the direction of optical rotation differs from that of the chiral agent for use in forming the light reflective layer 14*a*. For example, in an embodiment where the liquid crystal composition for forming the light reflective layer 14*a* contains a dextrorotatory chiral agent, the composition for the layer 14*b* preferably contains a levorotatory chiral agent; and in an embodiment where the liquid crystal composition for forming the light reflective layer 14*a* contains a levorotatory chiral agent, the composition for the layer 14*b* preferably contains a dextrorotatory chiral agent.

Preferably, the layer of reflecting a right circularly-polarized light and the layer of reflecting a left circularly-polarized light are adjacent to each other. In this embodiment, the two light reflective layers both have a helical pitch on the same level and each have optical rotation in the direction opposite to each other. This embodiment is preferred as being capable of reflecting any of left and right circularly-polarized light having a wavelength on the same level. For example, there may be mentioned an example of this embodiment where one light reflective layer is formed of a curable liquid crystal composition containing a dextrorotatory chiral agent and the other light reflective layer is formed of a curable liquid crystal composition containing a levorotatory chiral agent, and the helical pitch of these light reflective layer is on the same level. In case where the film has at least two pairs of the neighboring two light reflective layers of those types and where the pairs differ in point of the helical pitch of the constitutive layer, the wavelength band of the light to be reflected may be broadened and the film could exhibit broadband light reflectivity.

(Winding)

Preferably, the production method of the invention includes a step of winding up the film into a roll. The winding method is not specifically defined.

In one embodiment, for example, the film may be wound up into a roll around a winding core having a diameter of from 80 to 300 mm.

The timing for the winding is not also specifically defined. For example, the film may be wound up in every cycle of the steps (b) to (d), or may be wound up after repetition of plural cycles of the steps (b) to (d) to form a laminate of two or more light reflective layers. In any of those embodiments, the production method of the invention can exhibit the intended effect.

The winding may be attained before commercial release of the film as final products, or that is, the light reflective film of the invention to be described below may be in the form of a roll.

[Light Reflective Film]

The light reflective film of the invention is produced according to the production method of the invention. The light reflective film of the invention is described below.

Figure 2:
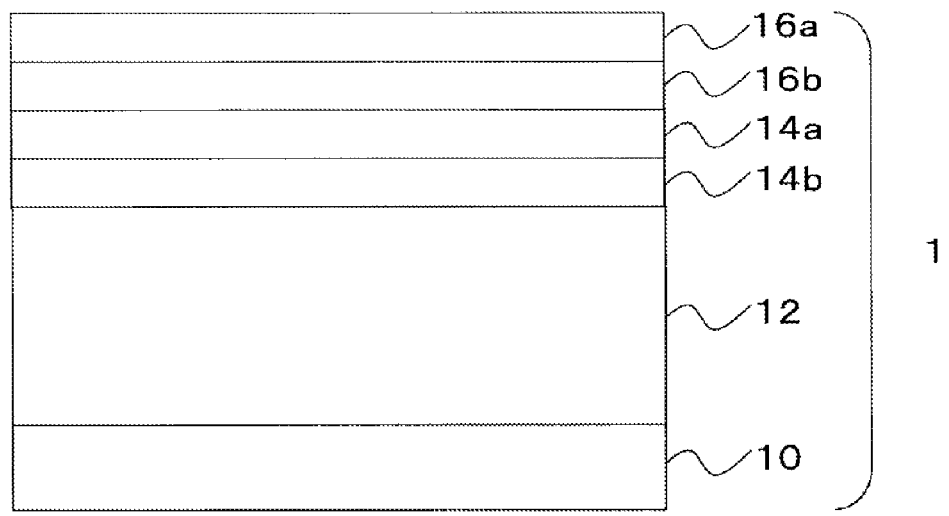
FIG. 2 is a cross-sectional view of another example of the light reflective film produced according to the production method of the invention.

Examples of the light reflective film produced according to the production method are shown in FIG. 1 and FIG. 2.

The light reflective film 1 shown in FIG. 1 has light reflective layers 14*a* and 14*b* each having a cholesteric liquid crystal phase fixed therein and repeatedly laminated as at least two layers on one surface of a resin film 12, and has a hard coat layer 10 formed on the other surface of the resin film 12 having no light reflective layer thereon. The light reflective film 1 shown in FIG. 2 additionally has light reflective layers 16*a* and 16*b* each having a cholesteric liquid crystal phase fixed therein. The light reflective film of the invention is not limited to these embodiments, and an embodiment having 6 or more light reflective layers formed therein is also preferred. On the other hand, odd numbers of such light reflective layers may be formed.

In the light reflective film 1 shown in FIG. 1 and FIG. 2, each light reflective layer has a cholesteric liquid crystal phase fixed therein, and therefore the film exhibits light-selective reflectivity of reflecting a light having a specific wavelength, based on the helical pitch of the cholesteric liquid crystal phase therein. For example, in case where the neighboring light reflective layers (14*a* and 14*b*, 16*a* and 16*b*) have a helical pitch on the same level and have optical rotation in the direction opposite to each other, the embodiment is preferred as capable of reflecting both left and right circularly-polarized light having a wavelength on the same level. For example, there may be mentioned one example of the light reflective film 1 of FIG. 1 in which the light reflective layer 14*a* of the light reflective layers 14*a* and 14*b* is formed of a liquid crystal composition containing a dextrorotatory chiral agent and the light reflective layer 14*b* is formed of a liquid crystal composition containing a levorotatory chiral agent and in which the light reflective layers 14*a* and 14*b* both have a helical pitch on the same level of $d_{14}$ nm.

There may be also mentioned one example of the light reflective film 1 of FIG. 2, in which the relationship between the light reflective layers 14*a* and 14*b* is the same as that in the light reflective film 1 of FIG. 1 mentioned above, in which the light reflective layer 16*a* is formed of a liquid crystal composition containing a dextrorotatory chiral agent and the light reflective layer 16*b* is formed of a liquid crystal composition containing a levorotatory chiral agent, and in which the light reflective layers 16*a* and 16*b* both have a helical pitch on the same level of $d_{16}$ nm, satisfying $d_{14} \neq d_{15}$. The light reflective film 1 of FIG. 2 satisfying the condition exhibits the same effect as that of the above-mentioned light reflective film 1 of FIG. 1, and further advantages thereof are that the wavelength band of the light to be reflected is broadened owing to the light reflective layers 16*a* and 16*b* existing therein and the film exhibits light reflectivity of wider bandwidth.

The light reflective film produced according to the production method of the invention exhibits selective reflectivity characteristics based on the cholesteric liquid crystal phase in each constitutive layer. The light reflective film of the invention may have layers with any of right-torsion or left-torsion cholesteric liquid crystal phase fixed therein. Preferred is an embodiment where the film has layers with right-torsion or left-torsion cholesteric liquid crystal phase fixed therein at the same helical pitch, since the film of the embodiment has high selective reflectance to a light having a specific wavelength. Also preferred is an embodiment where the film has a plural pairs of layers with right-torsion or left-torsion cholesteric liquid crystal phase fixed therein at the same helical pitch, since the selective reflectance of film of the embodiment can be further increased and the selective reflectivity wavelength band may be further broadened to be wider.

The direction of the optical rotation of the cholesteric liquid crystal phase may be controlled depending on the type of the rod-shaped liquid crystal or on the type of the chiral agent to be added; and the helical pitch may be controlled depending on the concentration of the constitutive materials.

(Properties)

The total thickness of the light reflective laminate film is not specifically defined. In an embodiment having 4 or more layers each with a cholesteric liquid crystal phase fixed therein and having light reflectivity in a broad IR reflection range, or that is, having heat shieldability, the thickness of each layer may be from 3 to 6 μm or so, and the total thickness $d_3$ of the light reflective lamination film could be generally from 15 to 40 μm or so.

The selective reflection wavelength of each layer of the light reflective film of the invention is not specifically defined. By controlling the helical pitch depending on the intended purpose, the film may be made to have reflectivity to a light having a desired wavelength. In one embodiment of the film of the invention, at least one layer is a so-called IR-reflective film capable of reflecting a part of the light having a wavelength of at least 800 nm and falling within an IR wavelength region, and the film of this embodiment exhibits light shieldability owing to that layer therein. One example of the light reflective film of the invention can reflect at least 80%, preferably at least 90% of sunlight having a wavelength of from 900 nm to 1160 nm. Based on this property, when a window film is formed of the film of the invention, then it has a shielding coefficient of 0.7 or less, as defined in JIS A-5759 (films for building windowpanes), and can therefore attain high heat shieldability.

The light reflective film of the invention has a low haze, though processed for repeated winding up into a roll and unrolling, and concretely has a haze of less than 0.8%. The light reflective film to be stuck to windowpanes or the like is required to be transparent, and the haze thereof is preferably lower. The haze is preferably at most 0.6%, more preferably at most 0.55%. The haze may be measured according to JIS K7136:2000 (measurement of haze of plastic transparent materials).

(Configuration)

Regarding the configuration thereof, the light reflective film of the invention may be in the form of a wide-spread sheet or a wound-up roll, but is preferably in the form of a wound-up roll. More preferably, the light reflective film of the invention can keep good optical properties even when stored and transported in the form of a wound-up roll after its production, in addition to having good optical properties after repeated operation of winding up into a roll and unrolling in the production process thereof.

The light reflective film of the invention may be a self-supporting member capable of being used as a window part by itself, or may be a member that is not self-supporting by itself but is stuck to a self-supporting substrate such as a glass plate or the like.

(Use)

The use of the light reflective film of the invention is not specifically defined.

In using it, the light reflective film of the invention may be stuck to the surface of a glass plate, a plastic substrate or the like. In this embodiment, the surface of the heat-shielding member to be stuck to a glass plate or the like is preferably adhesive. In this embodiment, preferably, the light reflective film of the invention has an adhesive layer, an easy adhesion layer or the like capable of being stuck to the surface of the substrate such as a glass plate or the like. Needless-to-say, the light reflective film of the invention that is not adhesive may be stuck to the surface of the glass plate using an adhesive therebetween.

Preferably, the light reflective film of the invention has heat shieldability against sunlight, and more preferably, the film can well reflect the IR ray of 700 nm or more of sunlight.

The light reflective film of the invention can be used as a heat-shielding windowpane of itself for vehicles or buildings, or as a sheet or a film to be stuck to the windowpanes of vehicles or buildings for the purpose of imparting heat shieldability thereto. In addition, the film may also be used for freezer showcases, materials for plastic greenhouses for agricultural use, reflective sheets for agricultural use, films for solar cells, etc. Among them, the light reflective film of the invention is favorably used as a light reflective film to be stuck to windowpanes, from the viewpoint of the characteristics of high visible light transmittance and low haze thereof.

EXAMPLES

The characteristics of the invention are described more concretely hereinunder with reference to Examples and Comparative Examples. (Comparative Examples are not always examples of known arts.) In the following Examples, the material used, its amount and ratio, the details of the treatment and the treatment process may be suitably modified or changed not overstepping the sprit and the scope of the invention. Accordingly, the scope of the invention should not be limitatively interpreted by the Examples mentioned below.

Examples 1 to 3

Comparative Examples 1 to 5

1. Production of Light Reflective Film (1-1) Formation of Hard Coat Layer:

A hard coat layer coating liquid (A) or (B) having the composition mentioned below was applied onto one surface of a PET film having a thickness of 50 μm, to form a coating layer having a thickness of 4 μm. Next, this was irradiated with UV ray at 250 mJ/cm² to cure the layer. Thus, a hard coat film was prepared.

| Composition (A) for Hard Coat Layer Coating Liquid | |
|---|---|
| Urethane acrylate (UA122P, by Shin-Nakamura Chemical) | 80 parts by mass |
| Dipentaerythritol hexaacrylate (DPHA, by Nippon Kayaku) | 10 parts by mass |
| Pentaerythritol tetraacrylate (PETA, by Nippon Kayaku) | 10 parts by mass |
| Silica fine particles having a secondary mean particle size of 1 μm | 1 part by mass |
| Photopolymerization initiator (Irgacure 184, by Ciba Geigy) | 3 parts by mass |

| Composition (B) for Hard Coat Layer Coating Liquid | |
|---|---|
| Urethane acrylate (UA122P, by Shin-Nakamura Chemical) | 50 parts by mass |
| Dipentaerythritol hexaacrylate (DPHA, by Nippon Kayaku) | 10 parts by mass |
| Pentaerythritol tetraacrylate (PETA, by Nippon Kayaku) | 50 parts by mass |
| Silica fine particles having a secondary mean particle size of 1 μm | 1 part by mass |
| Photopolymerization initiator (Irgacure 184, by Ciba Geigy) | 3 parts by mass |

For controlling the surface energy of the hard coat layer, a fluoropolymer, β-(perfluorooctyl)ethyl acrylate (Light Acrylate FA-108, trade name by Kyoeisha Chemical Industry) was added to the hard coat layer coating liquid, by which the surface energy of the back side of the light reflective film of Examples and Comparative Examples, or that is, the surface energy of the hard coat layer thereof was controlled to be the value as in Table 4 given below. Concretely, in Example 1, the polymer was added to be in a amount of 50% by mass of the total mass of the entire hard coat layer; and in Example 3, the polymer was in an amount of 0.3% by mass thereof. In this, the surface energy was measured, using an automatic contact angle meter, Kyowa Interface Science's DM300.

(1-2) Preparation of Coating Liquid (Curable Liquid Crystal Composition):

Coating liquids each having the composition shown in Tables 1 and 2 below were prepared.

TABLE 1

Composition of Coating Liquid (A): right circularly-polarized light-reflecting layer

| Material (category) | Name of Material (Manufacturer) | Amount |
|---|---|---|
| Rod-shaped liquid crystal compound | RM-257 (Merck) | 10.000 parts by mass |
| Chiral Agent | LC-756 (BASF) | adjusted in accordance with the intended reflection wavelength |
| Polymerization Initiator | Irg-819 (Ciba Specialty Chemicals) | 0.419 parts by mass |
| Alignment Controlling Agent | Compound 1 shown below | 0.016 parts by mass |
| Solvent | 2-butanone (Wako Pure Chemicals) | 15.652 parts by mass |

TABLE 2

Composition of Coating Liquid (B): left circularly-polarized light-reflecting layer

| Material (category) | Name of Material (Manufacturer) | Amount |
|---|---|---|
| Rod-shaped liquid crystal compound | RM-257 (Merck) | 10.000 parts by mass |
| Chiral Agent | Compound 2 shown below | adjusted in accordance with the intended reflection wavelength |
| Polymerization Initiator | Irg-819 (Ciba Specialty Chemicals) | 0.419 parts by mass |
| Alignment Controlling Agent | Compound 1 shown below | 0.016 parts by mass |
| Solvent | 2-butanone (Wako Pure Chemicals) | 15.652 parts by mass |

Alignment Controlling Agent: Compound 1 (Compound Disclosed in JP-A 2005-99248)

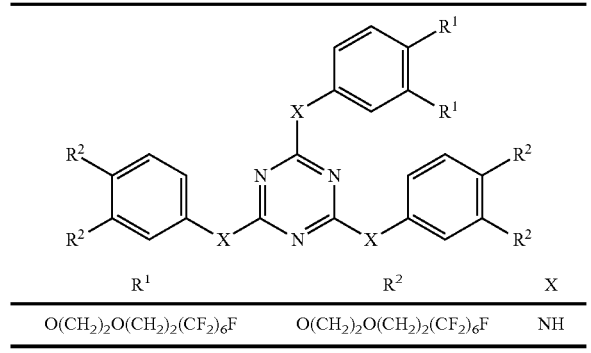

| R[1] | R[2] | X |
|---|---|---|
| $O(CH_2)_2O(CH_2)_2(CF_2)_6F$ | $O(CH_2)_2O(CH_2)_2(CF_2)_6F$ | NH |

Chiral Agent: Compound 2 (Compound Disclosed in JP 2002-179668)

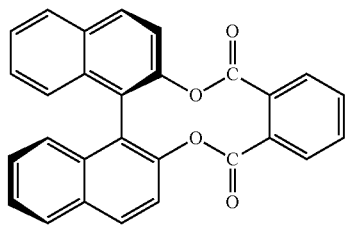

(1-3) Application of Curable Liquid Crystal Composition to Laminate, and Lamination of Light Reflective Layers:

In the above-mentioned coating liquids (A) and (B), the concentration of the chiral agent was controlled to prepare different coating liquids for use for forming the respective light reflective layers, which are shown in Table 3 below. The reflectivity and the reflection wavelength peak of the individual light reflective layers are also shown therein.

TABLE 3

| Layer No. | Reflectivity | Material | Reflection Wavelength Peak |
|---|---|---|---|
| 1 | Right circularly-polarized light-reflecting layer | Coating liquid (A) having a controlled chiral agent concentration | 900 nm |
| 2 | Right circularly-polarized light-reflecting layer | Coating liquid (A) having a controlled chiral agent concentration | 1030 nm |
| 3 | Right circularly-polarized light-reflecting layer | Coating liquid (A) having a controlled chiral agent concentration | 1160 nm |
| 4 | Left circularly-polarized light-reflecting layer | Coating liquid (B) having a controlled chiral agent concentration | 900 nm |
| 5 | Left circularly-polarized light-reflecting layer | Coating liquid (B) having a controlled chiral agent concentration | 1030 nm |
| 6 | Left circularly-polarized light-reflecting layer | Coating liquid (B) having a controlled chiral agent concentration | 1160 nm |

Using these coating liquids, the hard coat layer (HC layer), the PET support and the light reflective layers of No. 1 to No. 6 were laminated in that order, according to the process of the following (a) to (d).

(a) The prepared coating liquid shown in Table 3 was applied onto the surface of the PET film opposite to the hard coat layer formed on the film, at room temperature using a wire bar, in such a manner that the thickness of the dried layer could be from 4 to 5 μm or so;

(b) this was dried at room temperature for 30 seconds, and then heated in an atmosphere at 85° C. for 4 minutes to form a cholesteric liquid crystal phase; and (c) subsequently, at 30° C., using a metal halide lamp by Eye Graphic's and controlling the output of the lamp, this was irradiated with UV ray in a nitrogen-purged atmosphere at a dose of 250 mJ/cm$^2$ to fix the cholesteric liquid crystal phase to thereby form a first layer (underlayer).

(d) The formed first layer was cooled to room temperature, and then the steps (a) to (c) were repeated to thereby form second to sixth layers in that order on the first light reflective layer (underlayer).

(1-4) Winding:

After the light reflective layers were thus laminated, the resulting laminate film was wound up by 100 m around a winding core having a diameter of 167.5 mm into a roll.

As in the above, samples of light reflective films of Examples and Comparative Examples were produced.

2. Evaluation of Light Reflective Film

Thus produced, the light reflective film samples of Examples and Comparative Examples were evaluated in point of the following items.

(2-1) Reflectance:

Regarding heat shieldability, the solar reflectance of a coating film is computed generally according to the calculation method described in JIS R 316:1998 "Method for Testing Transmittance, Reflectance, Emissivity, and Solar Acquisition of Sheet Glasses"; and accordingly, the heat shieldability was determined according to the test method. For the measurement, used was a spectrophotometer equipped with an integrating sphere accessory device.

The film to be analyzed was wound up into a roll around a winding core having a diameter of 167.5 mm, then stored at room temperature for 1 hour, and unrolled, and the thus-unrolled film was analyzed as the sample thereof.

The following Table 4 shows the reflectivity measured at a wavelength of from 900 nm to 1160 nm.

(2-2) Haze:

When the alignment of cholesteric liquid crystal layer worsens, then not only the reflectance lowers but also the haze remarkably increases. Accordingly, as the index of alignment of cholesteric liquid crystal layer, the haze of the entire light reflective film was measured. The haze was measured according to JIS K7136:2000 (Method for Measuring Haze of Plastic Transparent Materials).

The film to be analyzed was wound up into a roll around a winding core having a diameter of 167.5 mm, then stored at room temperature for 1 hour, and unrolled, and the thus-unrolled film was analyzed as the sample thereof.

The obtained results are shown in Table 4 below. In Table 4, in the column of haze, "A" means that "the film was highly transparent and is on a practicable level for film for windowpanes"; and "B" means that "the film was whitish owing to scattering (mainly owing to internal scattering), and is unsatisfactory for use as film for windowpanes". In the column of haze, the parenthesized value means the haze value of the laminate film alone of the six light reflective layers (cholesteric liquid crystal layers), No. 1 to No. 6; and this was measured by removing the laminate film of cholesteric liquid crystal layers from the resin film (laminate of PET support and hard coat layer), and analyzing the thus-isolated laminate film with a haze meter.

(2-3) Pencil Hardness:

The pencil hardness of the surface of the hard coat layer was measured according to JIS K5400 (pencil scratch test method).

The obtained results are shown in Table 4 below.

TABLE 4

|  | Light reflective Layer | | HC Layer | | Evaluation | |
|---|---|---|---|---|---|---|
|  | Number of Layers (type) | Total Thickness (mm) | Pencil Hardness | Surface Energy (mN/m) | Reflectance | Haze (%) |
| Example 1 | 6 layers (Nos. 1 to 6) | 0.03 | Coating Composition (A) 2H | 10 | 93% A | 0.58 (0.28) A |
| Example 2 | 6 layers (Nos. 1 to 6) | 0.03 | Coating Composition (A) 2H | 18 | 93% A | 0.60 (0.3) A |
| Example 3 | 6 layers (Nos. 1 to 6) | 0.03 | Coating Composition (A) 2H | 27 | 93% A | 0.59 (0.19) A |
| Comparative Example 1 | 6 layers (Nos. 1 to 6) | 0.03 | Coating Composition (A) 2H | 35 | 73% B | 0.93 (0.63) B |
| Comparative Example 2 | 6 layers (Nos. 1 to 6) | 0.03 | Coating Composition (A) 2H | 41 | 68% C | 1.28 (0.98) B |
| Comparative Example 3 | 6 layers (Nos. 1 to 6) | 0.03 | Coating Composition (A) 2H | 48 | 59% C | 1.73 (1.43) B |
| Comparative Example 4 | 6 layers (Nos. 1 to 6) | 0.03 | Coating Composition (B) H | 18 | 76% B | 0.88 (0.58) B |
| Comparative Example 5 | 6 layers (Nos. 1 to 6) | 0.03 | Coating Composition (B) H | 27 | 71% B | 0.96 (0.66) B |

From Table 4, it is known that the light reflective films of the invention exhibit broadband light reflectivity and good reflection performance and have low haze.

On the other hand, it is known that, in the films of Comparative Examples 1 to 3, the surface energy of the hard coat layer is on a level of more than 30 mN/m, and the films have low reflectivity and high haze. The films of Comparative Examples 4 and 5 differ from those of Examples 2 and 3 in that the hard coat layer coating liquid in the former was changed so that the pencil hardness of the hard coat layer was on a lowered level; and it is known that the former films both have low reflectivity and high haze.

From the above, it is known that the invention attains high reflectivity and low haze.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2010-164984, filed on Jul. 22, 2010, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A method for producing a light reflective film, comprising:
   (a) forming a hard coat layer having a surface energy of less than 30 mN/m and a pencil hardness of at least 2H, on one surface of a resin film to produce a laminate;
   (b) applying a curable liquid crystal composition onto the surface of the laminate opposite to the side thereof given the hard coat layer;
   (c) drying the applied curable liquid crystal composition to be in a state of a cholesteric liquid crystal phase;
   (d) promoting the curing reaction of the curable liquid crystal composition to fix the cholesteric liquid crystal phase thereby forming a light reflective layer;
   (e) repeating at least once the process of from (b) to (d) on the laminate having the light reflective layer formed thereon; and
   (f) winding up the laminate having the light reflective layer and unrolling the laminate that has been wound up, prior to the repeating the process from (b) to (d).

2. The method for producing a light reflective film according to claim 1, wherein the curable liquid crystal composition contains a polymerizable rod-shaped liquid crystal compound, an alignment controlling agent capable of controlling the alignment of the polymerizable rod-shaped liquid crystal compound, and a solvent.

3. The method for producing a light reflective film according to claim 1, wherein in the process of (b) to (e), at least one layer of reflecting a right circularly-polarized light and at least one layer of reflecting a left circularly-polarized light are formed.

4. The method for producing a light reflective film according to claim 1, which includes aligning the surface of the laminate on the side opposite to the side thereof having the hard coat layer formed thereon, between the step (a) and the step (b).

5. The method for producing a light reflective film according to claim 4, which includes aligning the surface of the laminate by rubbing treatment.

6. The method for producing a light reflective film according to claim 1, which includes forming an alignment film on the laminate on the side opposite to the side thereof having the hard coat layer formed thereon, and aligning the surface of the alignment film, between the step (a) and the step (b).

7. The method for producing a light reflective film according to claim 1, which includes forming the hard coat layer by coating a hard coat layer composition.

8. The method for producing a light reflective film according to claim 7, wherein the hard coat layer composition contains a difunctional or more polyfunctional polymerizable monomer, a fluorine compound and silica particles.

9. A light reflective film produced by the method for producing a light reflective layer according to claim 8.

10. The light reflective film according to claim 9 wound up into a roll.

11. The method for producing a light reflective film according to claim 1, which includes forming the hard coat layer by using a hard coat layer composition containing a difunctional or more polyfunctional polymerizable monomer.

12. The method for producing a light reflective film according to claim 11, wherein the polymerizable monomer is a difunctional or more polyfunctional (meth)acrylate.

13. The method for producing a light reflective film according to claim 11, wherein the polymerizable monomer is at least one of dipentaerythritol hexaacrylate and pentaerythritol tetraacrylate.

14. The method for producing a light reflective film according to claim 1, which includes forming the hard coat layer by using a hard coat layer composition containing a fluorine compound.

15. The method for producing a light reflective film according to claim 14, wherein the fluorine compound is a (meth) acrylate having a perfluoroalkyl group.

16. The method for producing a light reflective film according to claim 14, further comprising adjusting the surface energy of the hard coat layer to be less than 30 mN/m with the fluorine compound.

17. The method for producing a light reflective film according to claim 1, which comprises forming the hard coat layer by using a hard coat layer composition containing a silicon compound.

18. The method for producing a light reflective film according to claim 1, wherein the hard coat layer has a thickness of from 0.1 to 15 µm.

19. The method for producing a light reflective film according to claim 1, wherein the resin film is a polyethylene terephthalate film.

20. The method for producing a light reflective film according to claim 1, which is for producing a light reflective film to be stuck to windowpanes.

* * * * *